(12) United States Patent
Shibata et al.

(10) Patent No.: US 11,115,684 B2
(45) Date of Patent: Sep. 7, 2021

(54) SYSTEM, METHOD, AND PROGRAM FOR DISTRIBUTING LIVE VIDEO

(71) Applicant: DeNA Co., Ltd., Tokyo (JP)

(72) Inventors: Kazuto Shibata, Tokyo (JP); Yasunori Beppu, Tokyo (JP); Seiichiro Sumiyoshi, Tokyo (JP); Yujiro Eto, Tokyo (JP); Koji Murata, Tokyo (JP)

(73) Assignee: DeNA CO., LTD., Tokyo (JP)

( * ) Notice: Subject to any disclaimer, the term of this patent is extended or adjusted under 35 U.S.C. 154(b) by 53 days.

(21) Appl. No.: 16/513,464

(22) Filed: Jul. 16, 2019

(65) Prior Publication Data

US 2020/0029103 A1 Jan. 23, 2020

(30) Foreign Application Priority Data

Jul. 18, 2018 (JP) .............................. JP2018-135331
Nov. 8, 2018 (JP) .............................. JP2018-210171

(51) Int. Cl.
*H04H 60/33* (2008.01)
*H04N 21/2187* (2011.01)
*G06Q 30/02* (2012.01)
*H04N 21/475* (2011.01)
*H04N 21/24* (2011.01)

(52) U.S. Cl.
CPC ..... *H04N 21/2187* (2013.01); *G06Q 30/0214* (2013.01); *H04N 21/2407* (2013.01); *H04N 21/4756* (2013.01)

(58) Field of Classification Search
CPC ........... H04N 21/2187; H04N 21/4758; H04N 21/4784
See application file for complete search history.

(56) References Cited

U.S. PATENT DOCUMENTS

| | | | | |
|---|---|---|---|---|
| 2009/0024605 | A1* | 1/2009 | Yang ..................... | G06F 16/954 |
| 2009/0089352 | A1* | 4/2009 | Davis ................... | H04N 21/812 |
| | | | | 709/201 |
| 2011/0225239 | A1* | 9/2011 | Kansal .................. | G06Q 10/10 |
| | | | | 709/204 |
| 2016/0373499 | A1* | 12/2016 | Wagner ................. | G06Q 50/01 |

FOREIGN PATENT DOCUMENTS

JP 2015-90526 A 5/2015

* cited by examiner

*Primary Examiner* — Gigi L Dubasky
(74) *Attorney, Agent, or Firm* — Procopio, Cory, Hargreaves & Savitch LLP (57) ABSTRACT

A video distribution server according to an embodiment provides a live video distribution service for distributing and viewing live video to a user via a user terminal. This server determines the ranking of distributors on the basis of live video distribution performance, sets a base reward quantity for distributors on the basis of the determined ranking, and gives distributors rewards in a quantity based on the distribution duration of the live video and the base reward quantity, so even if a distributor is a novice, he can obtain a reward in a quantity based on the distribution duration and the base reward quantity by continuing to distribute live video.

7 Claims, 10 Drawing Sheets

User information table 411

| User account |
| --- |
| Basic information |
| Distribution history information |
| Viewing history information |
| Followed user information |
| Follower information |
| Ranking |
| Ranking meter value |
| Number of held coins |
| Number of held diamonds |
| ... |

FIG. 3

| Ranking band | S | | | A | | | B | | | C | | | D | | | E |
|---|---|---|---|---|---|---|---|---|---|---|---|---|---|---|---|---|
| Ranking | S+ | S | S- | A+ | A | A- | B+ | B | B- | C+ | C | C- | D+ | D | D- | E |

FIG. 4

Distribution information table 412

| |
|---|
| Distribution ID |
| Distributor user account |
| Distribution date and time |
| Distribution duration |
| Number of viewers (current value and maximum value) |
| Number of comments |
| Number of likes |
| Number of items |
| Distribution points |
| Valid/invalid classification |
| ... |

| Rating based on distribution points in ranking band on previous day | Change in ranking meter value |
|---|---|
| Top 10% | +2 |
| Top 11-30% (remaining 20% after subtracting top 10% from top 30%) | +1 |
| Middle 30% | ±0 |
| Bottom 50% | −1 |
| *No distribution that day | −1 |

FIG. 12

| How ranking was updated | Necessary ranking meter value |
|---|---|
| Increase in ranking spans across the ranking band | +4 |
| Ranking increase within a given ranking band | +2 |
| Ranking decrease within a given ranking band | −2 |
| Decrease in ranking spans across the ranking band | −6 |

SYSTEM, METHOD, AND PROGRAM FOR DISTRIBUTING LIVE VIDEO

CROSS-REFERENCE TO RELATED APPLICATIONS

This application claims foreign priority under 35 USC 119 based on Japanese Patent Application Nos. JP 2018-135331 filed on Jul. 18, 2018 and JP 2018-210171 filed on Nov. 8, 2018, the contents of which is incorporated herein in its entirety by reference.

STATEMENT REGARDING PRIOR DISCLOSURES BY THE INVENTORS

The inventors of the present application authored and disclosed the subject matter of the present application on May 18, 2018 in an online publication. This prior disclosure is being submitted in an Information Disclosure Statement in the present application as NPL1 (https://pococha.com/banners/renewal201806_info) and NPL2 (https://twitter.com/pococha_jp/status/997303078641582080). Additionally, the inventors of the present application authored and disclosed the subject matter of the present application on Jun. 1, 2018 in an online publication. This prior disclosure is being submitted in an Information Disclosure Statement in the present application as NPL3 (https://play.google.com/store/apps/details?id=com.dena.pokota) and NPL4 (https://apps.apple.com/jp/app/pococha-%E3%83%9D%E3%82%B3%E3%83%81%20E3%83%A3-%E3%83%A9%E3%82%A4%E3%83%96%E9%85%8D%20E4%20BF%A1%E3%82%A2%E3%83%97%E3%83%AA/id1175969205).

BACKGROUND

1. Field

The present example implementations relates to a system, method, and information processing program (e.g., non-transitory computer-readable medium including instructions to be performed on a processor) for distributing live video.

2. Related Art

In the related art, rewards are given to posters/distributors of video in a video distribution service. For example, a reward corresponding to the number of times an advertisement incorporated in a video has been watched is given to a poster, etc. Also, with a system for distributing live video, while live video is being distributed, it is sometimes the case that items are inputted by viewers to distributors, and a portion of the sales of the items is paid out to the distributors (see Patent Document 1 below, for example).

PRIOR ART DOCUMENT

Patent Documents

[Patent Document 1]: Japanese Patent Application 2015-90526

SUMMARY

Problems to be Solved

However, with the conventional reward system discussed above, although well-known distributors that have many devoted fans receive numerous rewards, novice distributors who are just starting to distribute videos cannot expect to receive many rewards. For this reason, such rewards do not provide much motivation for a novice distributor to continue distributing video. In view of this, it is believed that the distribution of videos would be promoted by coming up with a way for even novice distributors or the like to obtain appropriate rewards.

One object of an embodiment of the present example implementations is to promote the distribution of live video by various distributors, including novices. Other objects of embodiments of the present example implementations will become apparent by reference to this Specification in its entirety.

Means for Solving the Problems

The system according to one embodiment of the present example implementations is a live video distribution system comprising one or more computer processors, wherein, in response to the execution of a readable command, the one or more computer processors execute processing to distribute, to each of a plurality of viewers, live video provided by each of a plurality of distributors, processing to determine the ranking of each of the plurality of distributors from among a plurality of specific rankings on the basis of at least the live video distribution performance of each of the plurality of distributors, processing to set a base reward quantity for each of the plurality of distributors on the basis of at least the ranking of each of the plurality of distributors, and processing to give each of the plurality of distributors rewards in a quantity based on at least the distribution duration of the live video and the base reward quantity.

The method according to one embodiment of the present example implementations is a method for distributing live video, which is executed by one or more computers, said method comprising the steps of distributing live video provided by each of a plurality of distributors to each of a plurality of viewers, determining the ranking of each of the plurality of distributors from among a plurality of specific rankings on the basis of at least the live video distribution performance for each of the plurality of distributors, setting a base reward quantity for each of the plurality of distributors on the basis of at least the ranking of each of the plurality of distributors, and giving each of the plurality of distributors rewards in a quantity based on at least the distribution duration of the live video and the base reward quantity.

The program (e.g., non-transitory computer-readable medium including instructions to be performed on a processor) according to one embodiment of the present example implementations is a program for distributing live video, wherein, in response to being executed by one or more computers, said program causes the one or more computers to execute processing to distribute, to each of a plurality of viewers, live video provided by each of a plurality of distributors, processing to determine the ranking of each of the plurality of distributors from among a plurality of specific rankings on the basis of at least the live video distribution performance of each of the plurality of distributors, processing to set a base reward quantity for each of the plurality of distributors on the basis of at least the ranking of each of the plurality of distributors, and processing to give each of the plurality of distributors rewards in a quantity based on at least the distribution duration of the live video and the base reward quantity.

Effects

Various embodiments promote the distribution of live video by various distributors, including novices.

DETAILED DESCRIPTION

Embodiments of the present example implementations will now be described with reference to the drawings.

Figure 1:
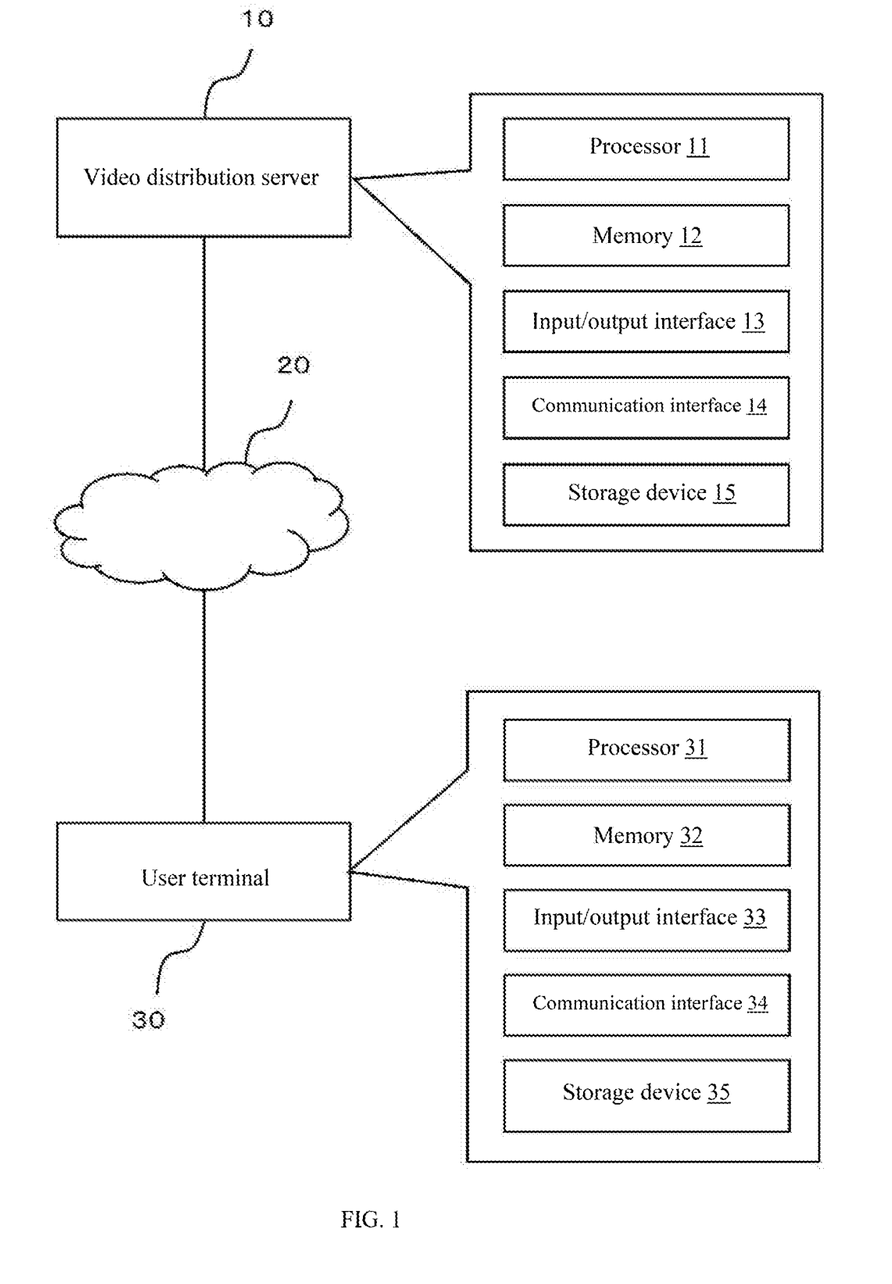
FIG. 1 A block diagram showing the simplified configuration of a network including a video distribution server 10 according to an embodiment of the example implementations.

FIG. 1 is a block diagram showing the simplified configuration of a network including a video distribution server 10 according to an embodiment of the present example implementations. As shown in the drawing, the video distribution server 10 is connected so as to be able to communicate with a user terminal 30 via a communication network 20 such as the Internet. Only one user terminal 30 is shown in FIG. 1, but the server 10 is connected to be able to communicate with a plurality of user terminals 30. The video distribution server 10 provides the user with a live video distribution service for distributing and viewing live video via a user terminal 30. In this embodiment, the user of the user terminal 30 can be a distributor who distributes live video, and can also be a viewer who views live video provided by other users. The video distribution server 10 is an example of a device in which all or part of the system of the present example implementations is installed.

The video distribution server 10 is configured as a typical computer and, as shown in FIG. 1, it comprises a computer processor 11, a main memory 12, an input/output interface 13, a communication interface 14, and a storage device 15, with these components being electrically connected via a bus or the like (not shown).

The computer processor 11 is configured as a CPU, a GPU, or the like, reads various programs (e.g., non-transitory computer-readable medium including instructions to be performed on a processor) that are stored in the storage device 15 into the main memory 12, and executes various kinds of commands included in these programs. The main memory 12 is constituted by a DRAM or the like, for example.

The input/output interface 13 includes various kinds of input/output devices for exchanging information with a user or the like. The input/output interface 13 includes, for example, information input devices such as keyboards and pointing devices (such as a mouse and a touch panel), audio input devices such as microphones, and image input devices such as cameras. The input/output interface 13 includes an image output device such as a display, and an audio output device such as a speaker.

The communication interface 14 is implemented as hardware such as a network adapter, various kinds of communication software, or combinations thereof, and is configured to allow for wired or wireless communication via a communication network 20 or the like.

The storage device 15 is constituted by a magnetic disk, a flash memory, or the like, for example. The storage device 15 stores various kinds of programs (e.g., non-transitory computer-readable medium including instructions to be performed on a processor), including an operating system, as well as various kinds of data and so forth.

In this embodiment, the video distribution server 10 can be configured using a plurality of computers each having the hardware configuration described above. For example, the video distribution server 10 can be made up of one or more server devices.

The video distribution server 10 thus configured can be configured to function as a web server and an application server, in which case it executes various kinds of processing in response to a request from the web browser and other applications installed on the user terminal 30 (such as an application for a live video distribution service), and transmits to the user terminal 30 screen data (such as HTML data), control data, and so forth according to the result of this processing. The user terminal 30 can display a web page based on the received data, or some other screen.

The user terminal 30 is configured as a typical computer and, as shown in FIG. 1, it comprises a computer processor 31, a main memory 32, an input/output interface 33, a communication interface 34, and a storage device 35, with these components being electrically connected via a bus or the like (not shown).

The computer processor 31 is configured as a CPU, a GPU, or the like, reads various programs (e.g., non-transitory computer-readable medium including instructions to be performed on a processor) that are stored in the storage device 35 into the main memory 32, and executes various kinds of commands included in these programs. The main memory 32 is constituted by a DRAM or the like, for example.

The input/output interface 33 includes various kinds of input/output devices for exchanging information with a user or the like. The input/output interface 33 includes, for example, information input devices such as keyboards and pointing devices (such as a mouse and a touch panel), audio input devices such as microphones, and image input devices such as cameras. The input/output interface 33 includes an image output device such as a display, and an audio output device such as a speaker.

The communication interface 34 is implemented as hardware such as a network adapter, various kinds of communication software, or combinations thereof, and is configured to allow for wired or wireless communication via a communication network 20 or the like.

The storage device 35 is constituted by a magnetic disk, a flash memory, or the like, for example. The storage device 35 stores various kinds of programs (e.g., non-transitory computer-readable medium including instructions to be performed on a processor), including an operating system, as well as various kinds of data and so forth. The programs stored in the storage device 35 can be downloaded from an application market or the like and installed.

In this embodiment, the user terminal 30 can be configured as a smartphone, a tablet terminal, a wearable device, a personal computer, a dedicated game terminal, or the like.

The user of the user terminal 30 configured in this way can use the live video distribution service provided by the video distribution server 10 by executing communication with the video distribution server 10 via a web browser or other application installed in the storage 35 or the like.

Figure 2:
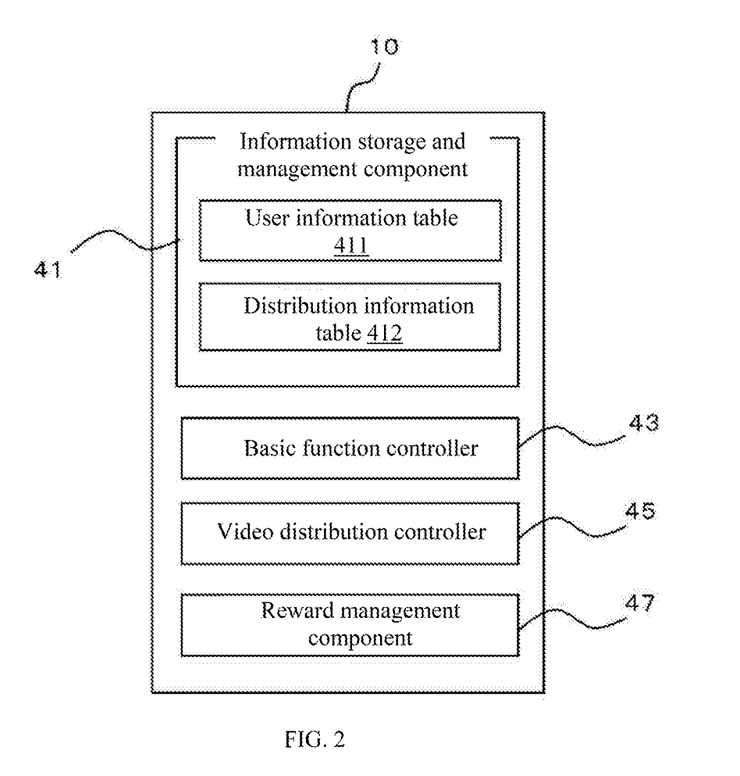
FIG. 2 A block diagram showing the simplified functions of the video distribution server 10.

Next, the functions of the video distribution server 10 in this embodiment will be described. FIG. 2 is a block diagram showing the simplified functions of the video distribution server 10. As shown in the drawing, the server 10 has an information storage and management component 41 that stores and manages various information, a basic function controller 43 that controls the basic functions of a live video distribution service, a video distribution controller 45 that controls the distribution of live video, and a reward management component 47 that manages rewards for distributors. These functions are realized by a combination of hardware, such as the computer processor 11 and the main memory 12, and the various programs (e.g., non-transitory computer-readable medium including instructions to be performed on a processor), data, and so forth stored in the storage device 15, etc. For example, the functions can be realized by having the computer processor 11 execute the commands included in a program read into the main memory. In addition, some or all of the functions of the server 10 shown in FIG. 2 can be realized by cooperation between the server 10 and the user terminal 30, or can be realized by the user terminal 30.

The information storage and management component 41 of the video distribution server 10 stores and manages the various kinds of information in the storage device 15, etc. For example, as shown in FIG. 2, the information storage and management component 41 can be configured to have a user information table 411 for managing information related to the user of the live video distribution service, and a distribution information table 412 for managing information related to the distribution of individual live videos.

The basic function controller 43 of the video distribution server 10 executes various processing related to the control of the basic functions of the live video distribution service. For instance, the basic function controller 43 transmits control data or screen data for various screens related to the basic function to the user terminal 30, executes various processing in response to an operation inputted by the user via this screen displayed on the user terminal 30, and transmits the control data or screen data corresponding to the result of this processing to the user terminal 30. The basic functions controlled by the basic function controller 43 include, for example, login processing (user authentication), fee charging control, user management (such as updating of the user information table 411, etc.), and management of individual live video distribution (such as updating of the distribution information table 412, etc.).

The video distribution controller 45 of the video distribution server 10 executes various processing related to control of the distribution of live video. For example, the video distribution controller 45 is configured to distribute live video provided by each of a plurality of distributors to each of a plurality of viewers. For instance, the video distribution controller 45 receives a live video transmitted from the user terminal 30 of a distributor (hereinafter sometimes referred to as a "distributor terminal 30"), and transmits this live video to each user terminal 30 of a plurality of viewers (hereinafter sometimes referred to as a "viewer terminal 30"). The live video is made up of an image inputted through the camera of the distributor terminal 30 and audio inputted through a microphone, for example. This distribution of live video can be performed, for example, by a streaming method that makes use of a protocol such as HTTP Live Streaming (HLS).

The reward management component 47 of the video distribution server 10 executes various processing related to the management of rewards for distributors. In this embodiment, the reward management component 47 is configured to determine the ranking of each distributor from among a plurality of specific rankings on the basis of at least the live video distribution performance of each distributor. The reward management component 47 is also configured to set the base reward quantity of each distributor on the basis of at least the determined ranking. The base reward quantity is configured as the reward quantity per unit of time (such as per hour), for example. Also, the base reward quantity is set, for example, to increase in proportion to the ranking.

The reward management component 47 is also configured to give each distributor rewards in a quantity based on at least the distribution duration of the live video and the base reward quantity. For example, the reward management component 47 is configured to give a distributor rewards in a quantity calculated by multiplying the base reward quantity by the distribution duration of the live video over a specific period of time. The rewards given to users include, but are not limited to, virtual and electronic items (including virtual currency), as well as real currency, for example.

Thus, with the video distribution server 10 in this embodiment, not only is the ranking of distributors determined on the basis of the live video distribution performance, but a base reward quantity for distributors is set on the basis of the determined rankings and rewards are given to distributors in a quantity based on the distribution duration of live video and the base reward quantity, so even novice distributors can obtain rewards in a quantity based on the distribution duration and the base reward quantity by continuing to distribute live video. Thus, the video distribution server 10 of this embodiment promotes the distribution of live video by various distributors, including novices.

In this embodiment, the live video distribution performance used to determine the ranking of distributors can include various information. For instance, the distribution performance includes, but is not limited to, the input results of input information inputted from viewers during the distribution of live video. This input information includes, for example, comments, likes, and virtual and electronic items, and in this case, the input results include the number of comments, the number of likes, the number of items, and the like. For example, the reward management component 47 is configured to determine the ranking of distributors such that the higher is the number of inputs of input information by viewers, the higher is the ranking of a distributor. With such a configuration, since the ranking of distributors is determined on the basis of the input results of the information inputted by viewers, it assists distributors in prompting viewers to input information, for example, the result of which is that it promotes more active communication in live video.

In addition, the reward management component 47 can be configured to give specific points to distributors on the basis of at least the live video distribution performance, and to determine the ranking of each distributor on the basis of at least these points given to each distributor over a specific period of time. That is, the configuration can be such that the ranking of distributors is determined via the specific points given on the basis of the live video distribution performance. With such a configuration, since the rankings are determined via specific points, this gives a distributor the enjoyment of acquiring the specific points.

Also, the reward management component 47 can be configured such that the rating of a distributor based on the specific points given over a specific period of time is set for each ranking group made up of one or a plurality of consecutive rankings, and the ranking of each distributor is determined so as to increase the ranking the higher is the set rating, and to decrease the ranking the lower is the set rating. With such a configuration, since the ranking is increased or decreased according to a rating based on specific points that have been acquired, distributors can be given even more enjoyment related to the acquisition of specific points.

Also, the reward management component 47 can be configured to determine the ranking of each distributor on the basis of at least the value of a specific parameter of each distributor configured such that the value increases the higher is the rating based on the specific points, and decreases the lower is this rating. That is, the rankings of distributors can be configured to be determined through the value of a specific parameter that varies based on a rating that is based on specific points. Such a configuration can provide a distributor with the enjoyment related to fluctuations in the value of the specific parameter.

The reward management component 47 can also be configured such that the ranking is increased for a distributor for which the value of the specific parameter becomes higher than a rank-increase threshold, and the ranking is decreased for a distributor for which the value of the specific parameter becomes lower than a rank-decrease threshold. In this case, the reward management component 47 can be configured such that when the next highest ranking above the current ranking of the distributor is in the same ranking group as the current ranking group, the ranking is increased to the next highest ranking if the value of the specific parameter is above a first rank-increase threshold, and when the next highest ranking is in a different ranking group from that of the current ranking group, the ranking is increased to the next highest ranking if the value of the specific parameter is above a second rank-increase threshold that is greater than the first rank-increase threshold. Similarly, the reward management component 47 can be configured such that when the next lowest ranking below the current ranking of the distributor is in the same ranking group as the current ranking group, the ranking is decreased to the next lowest ranking if the value of the specific parameter is below a first rank-decrease threshold, and when the next lowest ranking is in a different ranking group from that of the current ranking group, the ranking is decreased to the next lowest ranking if the value of the specific parameter is below a second rank-decrease threshold that is less than the first rank-decrease threshold. With this configuration, increasing or decreasing a ranking across ranking groups is less likely to occur than when ranking is increased or decreased within the same ranking group, and as a result, abrupt ranking fluctuations can be suppressed.

The reward management component 47 can also be configured to determine whether or not distribution is valid for each distribution of live video, and to give rewards in a quantity based on at least the base reward quantity and the live video distribution duration, excluding the distribution duration in distribution where distribution was determined to be invalid. That is, the reward management component 47 can be configured to exclude the distribution duration in distribution that has been determined to be invalid, in determining the quantity of the reward to be given. For example, the reward management component 47 can be configured to determine whether or not distribution is valid for each distribution of live video, on the basis of at least one of the following: the distribution duration, the number of viewers, the quantity of input information inputted from viewers, and the results of image analysis of the live video. For example, a distribution in which the distribution duration, the number of viewers, or the quantity of input information from viewers are below specific thresholds is determined to be invalid, or, if a moving person is not detected in the image, for example, as a result of image analysis of live video, the distribution is determined to be invalid. Such a configuration helps give appropriately set rewards while excluding invalid distribution.

Figure 3:
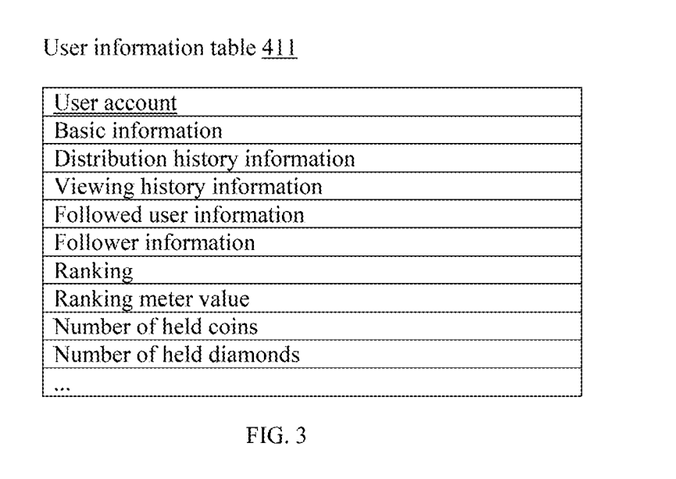
FIG. 3 A diagram illustrating an example of the information managed in a user information table 411.

Next, a specific example of the video distribution server 10 of this embodiment having such a function will be described. FIG. 3 is a diagram illustrating the information managed in a user information table 411 in this example. The user information table 411 manages information related to users of the live video distribution service and, as shown in FIG. 3, it manages information associated with the "user account" identifying an individual user, such as "basic information," which is the account name, age, sex, and other such basic information about the user; "distribution history information," which is information related to the distribution history of live video; "viewing history information," which is information related to the viewing history of live video distributed by other users; "followed user information", which is information related to other users followed by one user; "follower information," which is information related to other users (followers) who are following one user; "ranking," which indicates the ranking of a user who is a distributor; "ranking meter value" (specific parameter value), which is a parameter value for determining whether to increase or decrease a ranking; "number of held coins," which indicates how many virtual coins are held in the live video distribution service; and "number of held diamonds," which indicates how many virtual diamonds are held.

Figure 4:
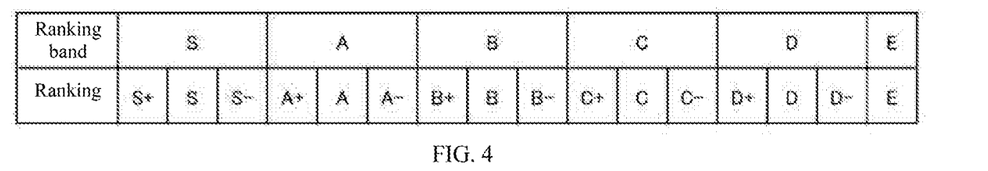
FIG. 4 A diagram illustrating rankings

FIG. 4 is a diagram illustrating the "ranking" in this example. As shown, in this example, there are six ranking bands (ranking groups) of "S," "A," "B," "C," "D," and "E", and each of the five ranking bands "S," "A," "B," "C," and "D" is made up of three rankings (for example, rankings in which a plus sign is added to the letter indicating the ranking band, rankings with just a letter, and rankings in which a minus sign is added to the letter indicating the ranking band, as in "S+," "S," and "S−,"). The ranking band of "E" is made up of just one ranking, "E." That is, in this example, there are 16 levels (3×5+1=16) of rankings.

Also, among the ranking bands, the "S" side is the highest and the "E" side is the lowest. In a given ranking band, the "+" is the highest and the "−" is the lowest. In this example, the ranking of a user is set to "D−" as the initial value.

Figure 5:
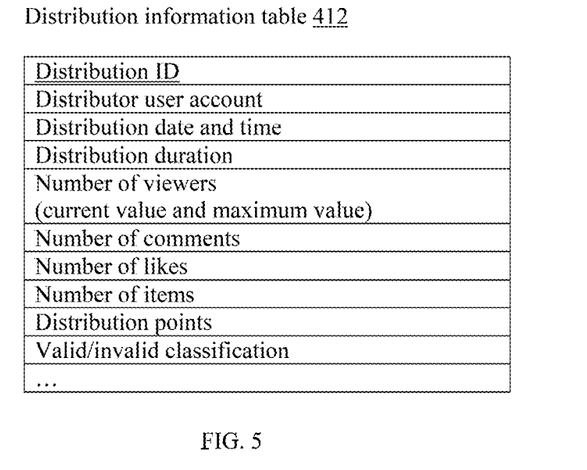
FIG. 5 A diagram illustrating an example of the information managed in a distribution information table 412.

FIG. 5 is a diagram illustrating the information managed in a distribution information table 412 in this example. The distribution information table 412 manages information related to the distribution of individual live videos and, as shown in the FIG. 5, it manages information associated with the "distribution ID" identifying individual distribution, such as "distributor user account," which identifies the distributor of a live video; "distribution date and time;" "distribution duration," which indicates the continuous duration of a distribution; "number of viewers (current value and maximum value);" "number of comments," which is the number of comments inputted by viewers; "number of likes," which is the number of "likes" inputted by viewers; "number of items," which is the number of items inputted by viewers; "distribution points," which is the distribution points (specific points) given for this distribution; and "valid/invalid classification," which indicates whether or not this distribution is valid.

Figure 6:
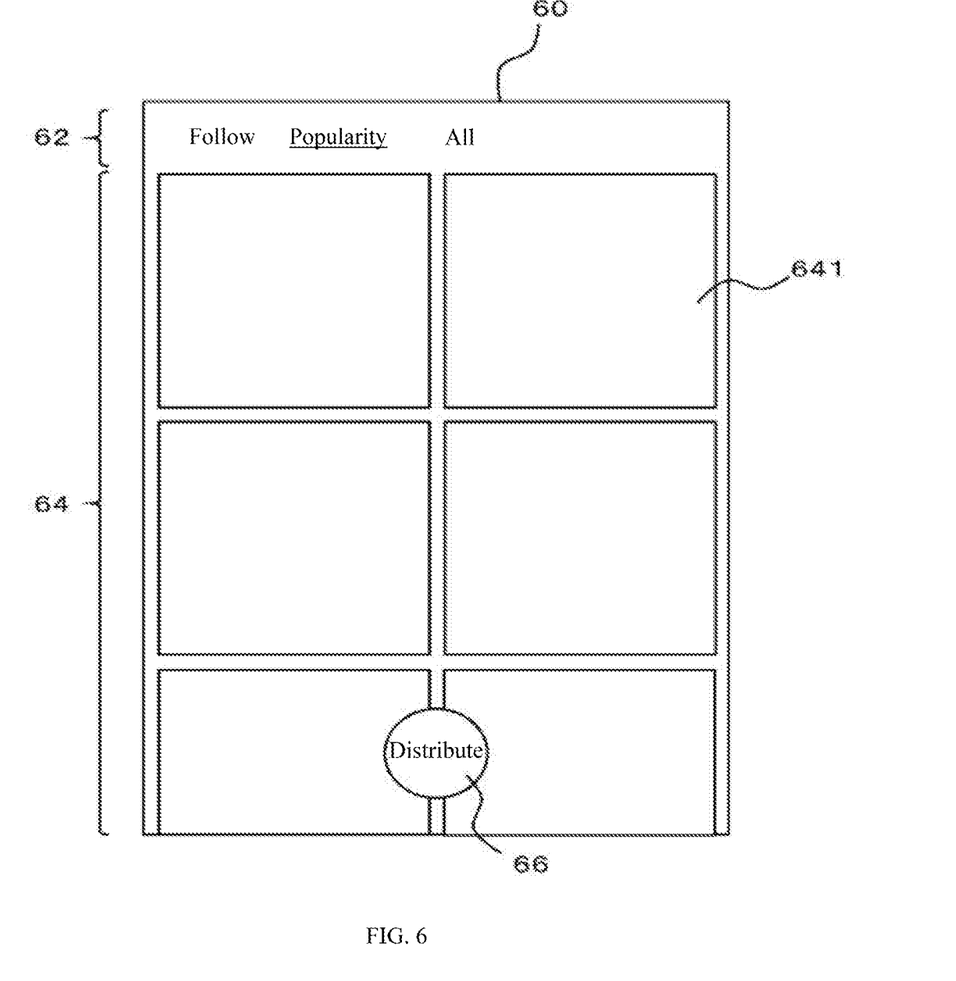
FIG. 6 A diagram illustrating an example of a top screen 60.

FIG. 6 is a diagram illustrating an example of a top screen 60 of the live video distribution service. As shown in the drawing, this screen 60 has a filter area 62 in which are displayed "Following," "Popularity," and "All;" a list display area 64 in which is displayed a list of live videos being distributed; and a distribution start button 66 that is displayed as "Distribute."

The filter area 62 is an area for setting filtering for the live video being distributed and displayed in the list display area 64. More specifically, when "Following" is selected in the filter area 62, the live videos listed in the list display area 64 are narrowed down to those live videos of users who are being followed by this user. Similarly, when "Popularity" is selected in the filter area 62, the live videos listed in the list display area 64 are narrowed down to those live videos chosen according to a specific selection condition for selecting popular videos (for example, live video for which the number of viewers (current value) is at or above a specific value). When "All" is selected in the filter area 62, a list of all the live videos being distributed is displayed without any filtering.

In the list display area 64, a plurality of individual display areas 641 each displaying information related to an individual live video are arranged in two columns. The individual display areas 641 display, for example, a still image preset by the distributor of the live video, the account name of the distributor, the number of viewers (current value), and so on. The list display area 64 is configured so that the individual display areas 641 that are displayed can be switched by flicking, sliding, or another such operation in the up or down direction.

The distribution start button 66 is selected by the user to start the distribution of live video as a distributor. When the distribution start button 66 is selected by the user, the distribution of live video begins, and more specifically, video made up of images inputted via the camera of the user terminal 30 and audio inputted via the microphone of the user terminal 30 begins to be transmitted to the server 10. Also, in response to the start of live video distribution, a new record is produced in the distribution information table 412.

Figure 7:
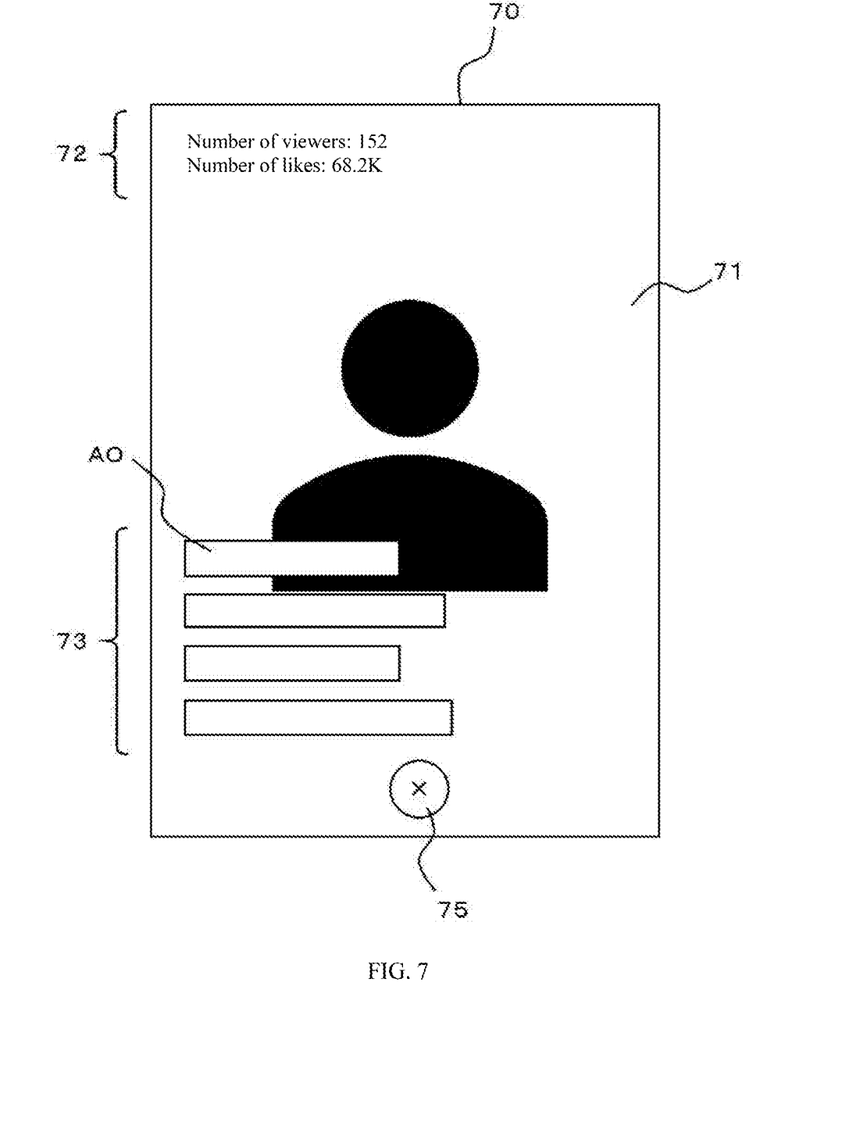
FIG. 7 A diagram illustrating an example of a distributor screen 70.

FIG. 7 shows an example of a distributor screen 70 that is displayed on the distributor terminal 30 when the distribution start button 66 is selected (that is, when the distribution of live video begins). This screen 70 has a video display area 71 corresponding to the entire screen, a basic information display area 72 located at the top of the screen, an action information display area 73 located near the lower-left corner of the screen, and a distribution stop button 75 located in the center at the bottom of the screen.

The video display area 71 displays a live video to be distributed, that is, an image inputted through the camera of the distributor terminal 30. Since the distributor usually films himself via the built-in camera of the distributor terminal 30, the live video to be distributed will include the distributor.

The basic information display area 72 displays basic information about this distribution, and more specifically, displays distributor information (profile image, etc.), the number of viewers (current value) of this distribution, the number of "likes" inputted by viewers for this distribution, and so forth.

The action information display area 73 displays information related to actions performed by viewers. More specifically, in this area 73, a plurality of action objects AO corresponding to individual actions by viewers are arranged in the up and down direction. The action information display area 73 is configured such that, when a new action is performed by a viewer, the corresponding action object AO is added on the lower side, and the existing action objects AO move upward in order. The action information display area 73 is configured so that the displayed action objects AO can be switched by flicking, sliding, or another such operation in the up or down direction. The actions of a viewer displayed in the action information display area 73 include entry (start of viewing), inputting a "like," inputting a comment, and inputting an item.

The distribution stop button 75 is used by the distributor to stop the distribution of the live video. When the distribution stop button 75 is selected by the distributor, distribution of the live video (transmission of the live video from the distributor terminal 30 to the server 10) is stopped.

Figure 8:
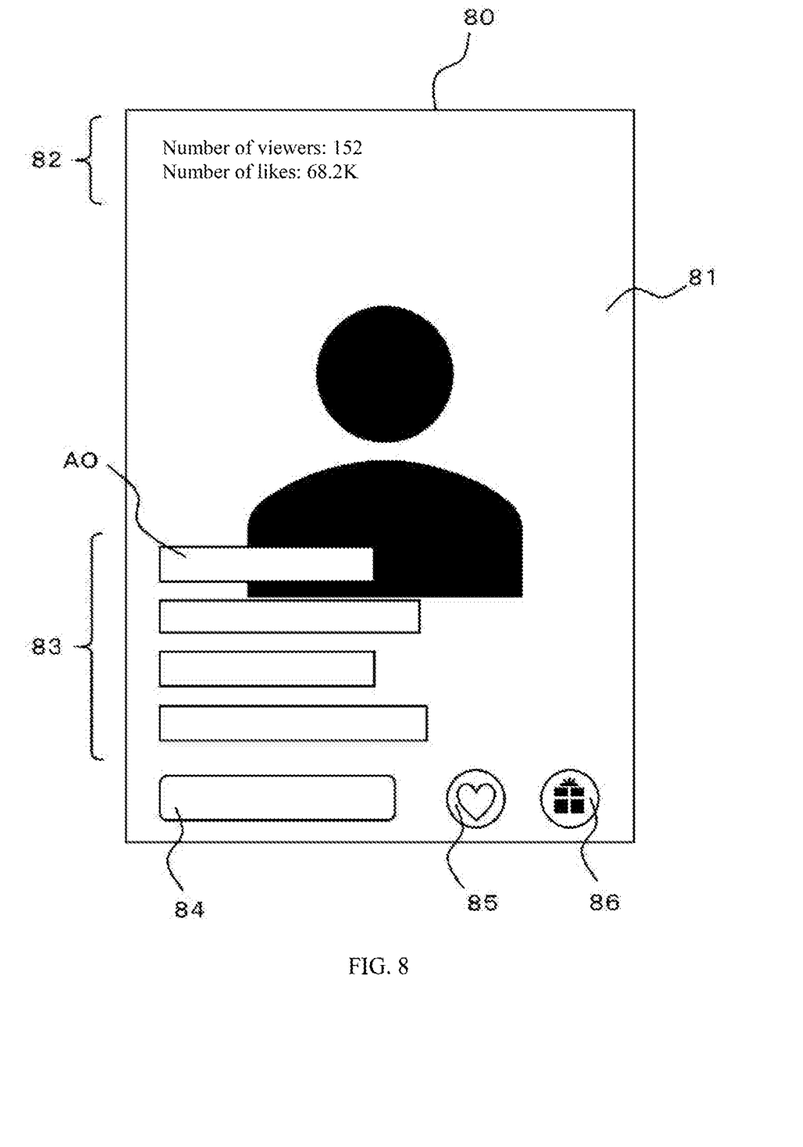
FIG. 8 A diagram illustrating an example of a viewer screen 80.

FIG. 8 shows an example of a viewer screen 80 displayed on the viewer terminal 30. For example, when any live video is selected by a viewer from the list display area 64 of the top screen 60, the viewer screen 80 for viewing the selected live video is displayed on the viewer terminal 30. As shown in FIG. 8, this screen 80 is similar to the above-mentioned distributor screen 70 in that it has a video display area 81 corresponding to the entire screen, a basic information display area 82 located at the top of the screen, and an action information display area 83 located near the lower-left corner of the screen. The viewer screen 80 also has at the bottom of the screen a comment input area 84, a "Like" button 85 with a heart mark displayed, and an item input button 86 with a symbol of a gift displayed.

The comment input area 84 is an area for the viewer to input comments. When the viewer inputs a comment via this area 84, the action object AO corresponding to the inputted comment is added to the action information display areas 73 and 83 of the distributor screen 70 of the distributor terminal 30 and the viewer screen 80 of each viewer terminal 30. In the action object AO corresponding to a comment are displayed the account name of the viewer who has inputted the comment, and the comment itself (text). Also, when a comment is inputted, the number of comments in the distribution information table 412 is updated (incremented by one).

The "Like" button 85 is used by a viewer to input a "like" to the distributor. When the button 85 is selected by the viewer, a "like" is inputted, and an action object AO corresponding to "like" is added to the action information display areas 73 and 83. In the action object AO corresponding to "like" is displayed, along with the account name of the viewer who inputted the "like", text indicating that a "like"

has been inputted. Also, when a "like" is inputted, a specific visual effect (such as an animation effect in which heart-shaped objects are displayed as flowing from the bottom of the screen toward the top) is added to the video display areas 71 and 81 of the distributor screen 70 and the viewer screen 80. Also, when a "like" is inputted, the "number of likes" in the distribution information table 412 is updated (incremented by one).

Figure 9:
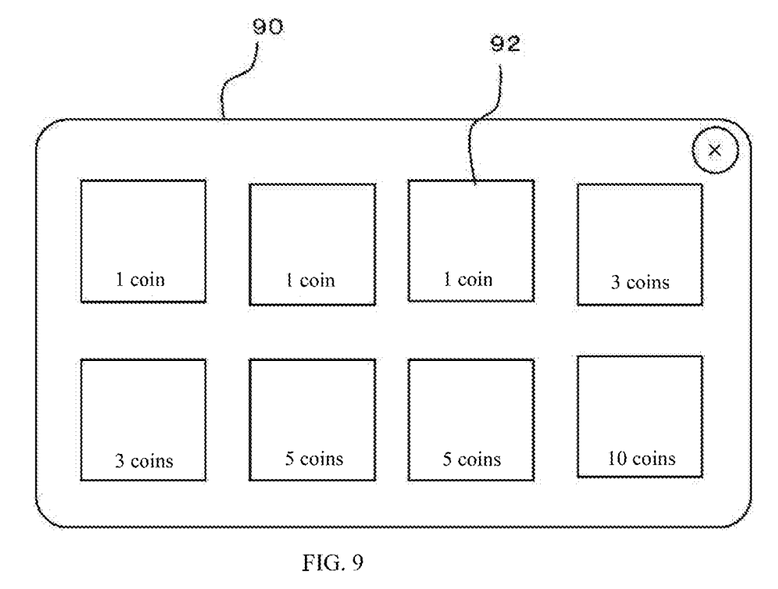
FIG. 9 A diagram illustrating an example of an item selection screen 90.

The item input button 86 is a button for the viewer to input an item. When this button 86 is selected by the viewer, the item selection screen 90 shown in FIG. 9 is displayed superimposed on the viewer screen 80. As shown in FIG. 9, this screen 90 displays a list of a plurality of individual display areas 92 each of which displays information related to an item. The individual display areas 92 display an image corresponding to an item, and the number of coins required to input that item.

In this example, a plurality of items that can be inputted by viewers are set in advance. When any item is selected by a viewer via the item selection screen 90, input of the selected item is carried out. When an item is inputted, an action object AO corresponding to the input of that item is added to the action information display areas 73 and 83. In the action object AO corresponding to the input of an item, the account name of the viewer who has inputted that item and the name of the inputted item are displayed. Also, when an item is inputted, a specific visual effect corresponding to that item is added to the video display areas 71 and 81. Furthermore, when an item is inputted, the number of items in the distribution information table 412 is updated (incremented by one). Also, when an item is inputted, the number of coins required to input the item is spent, and more specifically, the number of coins of the corresponding viewer decreases in the user information table 411. Thus, the coins in this example are used for acquisition/input of items.

Figure 10:
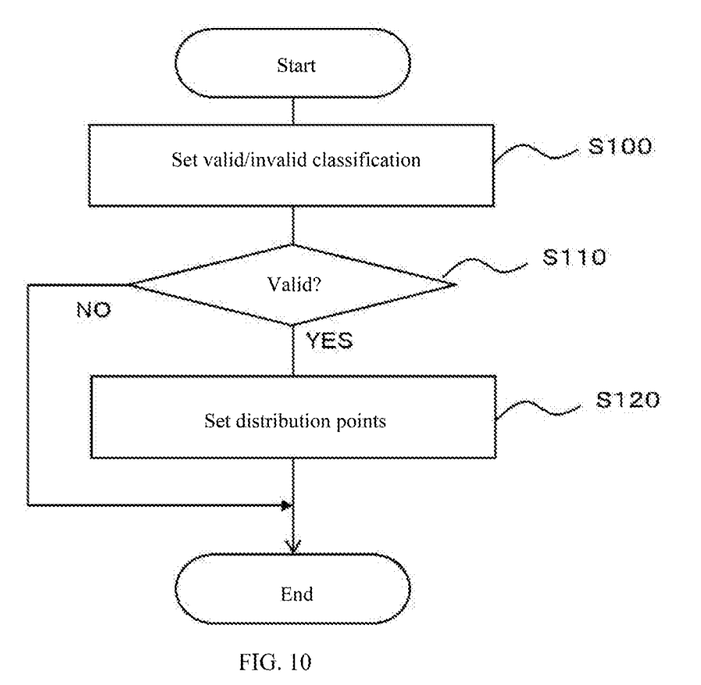
FIG. 10 A flowchart illustrating an example of the processing executed by the server 10 each time the distribution of an individual live video ends.

As described above, when a distributor selects the distribution stop button 75 on the distributor screen 70, the distribution of the live video ends. FIG. 10 is a flowchart illustrating an example of the processing executed by the server 10 each time the distribution of an individual live video ends. When the distribution of the live video ends, the server 10 first sets the valid/invalid classification of the distribution, as shown in the drawing (step S100). More specifically, if the distribution duration, the number of viewers (maximum value), and the number of comments are equal to or greater than specific lower limit values, it is determined that this distribution is valid, but if any of the distribution duration, the number of viewers (maximum value), and the number of comments is less than its specific lower limit value, it is determined that this distribution is invalid. For example, a distribution whose duration is excessively short (such as less than 5 minutes), a distribution whose number of viewers (maximum value) is excessively small (such as fewer than 10), and a distribution whose number of comments is excessively small (such as fewer than 100) is determined to be an invalid distribution. A value corresponding to the determination result is then set in the valid/invalid classification of the distribution information table 412. The viewer comment rate (the ratio of viewers who have inputted a comment to all viewers) may be used instead of the number of comments.

Then, if it has been determined that the distribution is a valid distribution (Yes in step S110), distribution points are set for that distribution (step S120). In this example, the distribution points are calculated on the basis of the number of viewers (maximum value), the number of likes, the number of comments, and the number of items, and are registered in the distribution information table 412. The distribution points are configured to increase in proportion to the number of viewers (maximum value), the number of likes, the number of comments, and the number of items.

On the other hand, if it has been determined that the distribution is an invalid distribution (No in step S110), no distribution points are set. Thus, in this example, a distribution where the distribution duration, the number of viewers (maximum value), or the number of comments is excessively small is determined to be an invalid distribution, and no distribution points are set.

Figure 11:
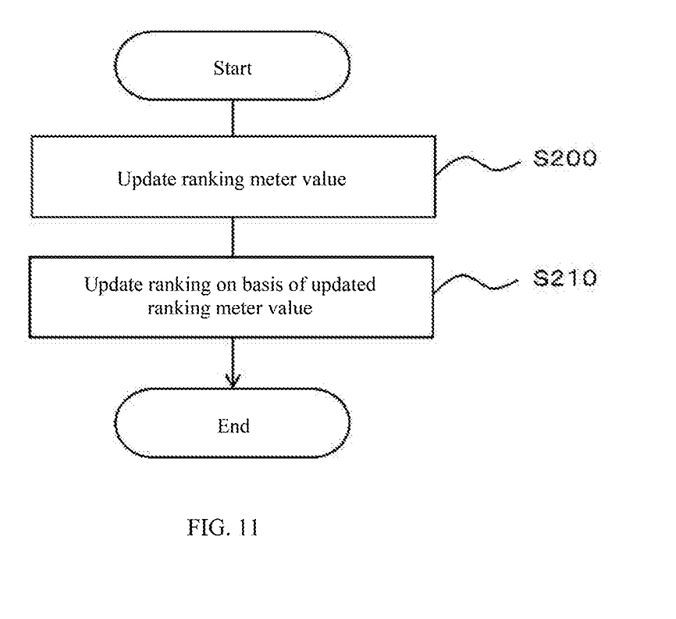
FIG. 11 A flowchart illustrating an example of the processing executed by the server 10 in updating a ranking.

In this example, the ranking on the current day is determined (updated) on the basis of the distribution points acquired by the user the previous day. FIG. 11 is a flowchart illustrating an example of the processing executed by the server 10 in updating the ranking of each user. This processing is executed on a daily basis during the night (e.g., daily at 3 a.m.).

Figure 12:
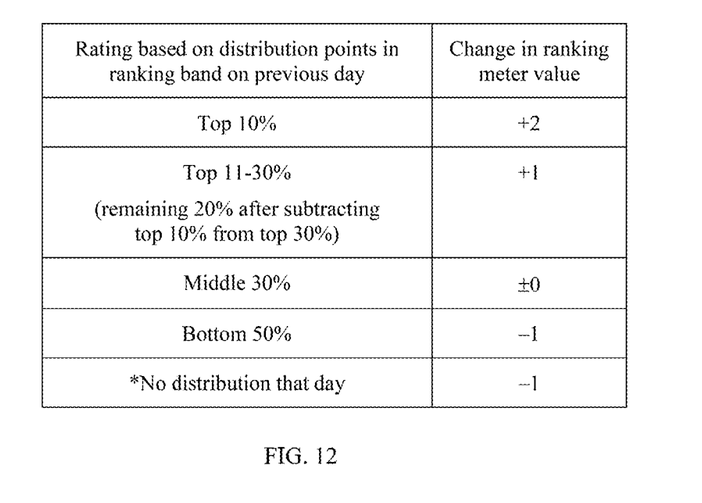
FIG. 12 A diagram illustrating rules for updating ranking meter values.

First, the server 10 updates the ranking meter value of each user as illustrated (step S200). FIG. 12 is a diagram illustrating ranking meter value update rules. As shown in this example the ranking meter value fluctuates on the basis of the rating of the distribution points acquired by the user on the previous day within the ranking band to which the user belongs. The distribution points acquired by a particular user on the previous day are calculated by referring to the distributor user account, the distribution date and time, and the distribution points in the distribution information table 412. If a user is performing several distributions on the same day, the distribution points acquired in each of these distributions are added together.

More specifically, as shown in FIG. 12, when the rating of distribution points within a ranking band is within the top 10%, the update rule for the ranking meter value is "+2" (points increased by two). Similarly, when this rating is within the top 11 to 30% (the remaining 20% after subtracting the top 10% from the top 30%), the change is "+1", and when this rating is within the middle 30% (from the top 31% to 60%), the change is "±0" (no increase or decrease), and when this rating is within the lower 40%, the change is "−1" (points decreased by one). If no distribution was performed on the previous day, the change of the ranking meter value is "−1" regardless of the rating within the ranking band.

In step S200, the ranking meter value of each user is updated according to the update rules shown in FIG. 12. If a user has a ranking meter value that is negative, and the change in the ranking meter value this time is an increase (more specifically, +2 or +1), the ranking meter value may be cleared to zero and increased from there. That is, if the change this time is "+2" for a user whose current ranking meter value is "−1," for example, then the ranking meter value is cleared to zero and then increased by two, and the ranking meter value after the change is "+2" (rather than "+1"). In this way, even a user with a negative ranking meter value (for example, a user with a low distribution frequency) can increase his ranking meter value all at once, and this promotes the distribution of live videos.

Figure 13:
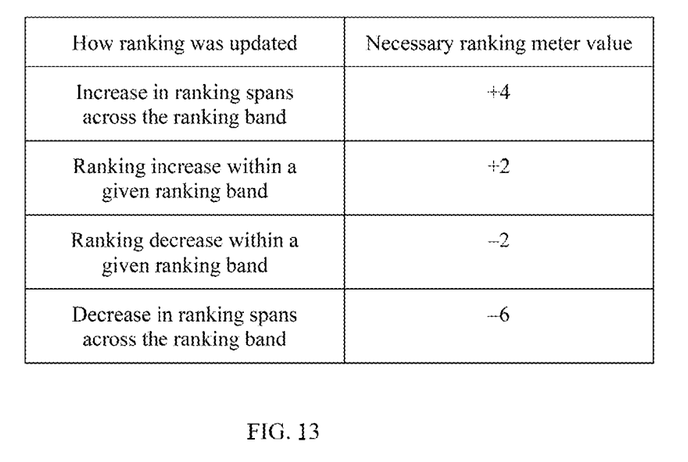
FIG. 13 A diagram illustrating the correlation between how a ranking was updated and the necessary ranking meter values.

After updating the ranking meter value of each user, next, the server 10 updates the ranking on the basis of the updated ranking meter value (step S210). FIG. 13 is a diagram illustrating the correlation between how a ranking was updated and the necessary ranking meter values. As shown in the figure, first, in a case in which an increase in ranking spans across a given ranking band (in other words, when increasing the ranking from the highest ranking within a given ranking band), the necessary ranking meter value is +4. That is, a user belonging to the highest ranking (such as A+) within a given ranking band moves up in ranking to the lowest ranking (such as S−) in the next highest ranking band when the ranking meter value becomes +4. Also, in a case in which a ranking is increased within a given ranking band (in other words, when increasing the ranking from the middle or lowest ranking within a given ranking band), the necessary ranking meter value is +2. That is, a user belonging to the middle or lowest ranking (such as B or B−) within a given ranking band moves up in ranking to the next highest ranking within the same ranking band (such as B+ or B).

Similarly, as shown in FIG. 13, in a case in which the ranking is decreased within a given ranking band (in other words, when decreasing the ranking from the highest or middle ranking within a given ranking band), the necessary ranking meter value is −2. That is, a user belonging to the highest or middle ranking (such as B+ or B) within a given ranking band moves down in ranking to the next lowest ranking within the same ranking band (such as B or B−). In a case in which a decrease in ranking spans across a given ranking band, the necessary ranking meter value is −6. That is, a user belonging to the lowest ranking (such as A−) within a given ranking band moves down in ranking to the highest ranking in the next lowest ranking band (such as B+). Thus, in this example, an increase or decrease in ranking across ranking bands has a larger absolute value of the necessary ranking meter value than an increase or decrease in ranking within the same ranking band. As a result, abrupt increases or decreases in ranking within a short period are suppressed.

In step S210, updating of the ranking based on the ranking meter value is performed according to the correlation shown in FIG. 13. The ranking meter value of a user whose ranking has been updated (a user whose ranking has increased or decreased) is cleared to zero.

Figure 14:
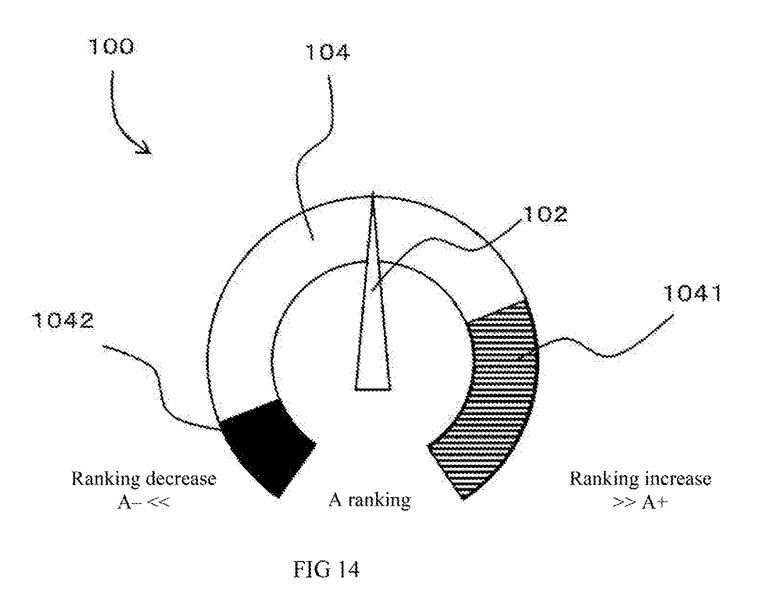
FIG. 14 A diagram illustrating an example of a ranking meter object 100.

FIG. 14 is a diagram illustrating an example of a ranking meter object 100 that displays the ranking meter value of a user. This object 100 is disposed, for example, on a profile screen or the like that displays basic information about the user. As shown, the ranking meter object 100 has a needle object 102 having a needle shape, and a scale object 104 having a C shape that opens downward. The current ranking of the user ("A ranking" in the example in FIG. 14) is displayed below the needle object 102. The needle object 102 is configured to swing (rotate) to the right as the ranking meter value increases, and to swing to the left as the ranking meter value decreases. The needle object 102 in FIG. 14 is in an upright state (pointing in the direction of 12 o'clock), and corresponds to a state in which the ranking meter value is zero. The needle object 102 inclines to the right as the ranking meter value increases in the positive direction, and to the left as the ranking value decreases in the negative direction. A rank-increase area 1041 corresponding to the ranking meter value necessary for an increase in ranking is set on the lower-right side of the scale object 104 and, similarly, a rank-decrease area 1042 corresponding to the ranking meter value necessary for a decrease in ranking is set on the lower-left side of the scale object 104. The user can look at the ranking meter object 100 to ascertain the current status of a ranking meter value that is headed toward a higher or lower ranking.

Figure 15:
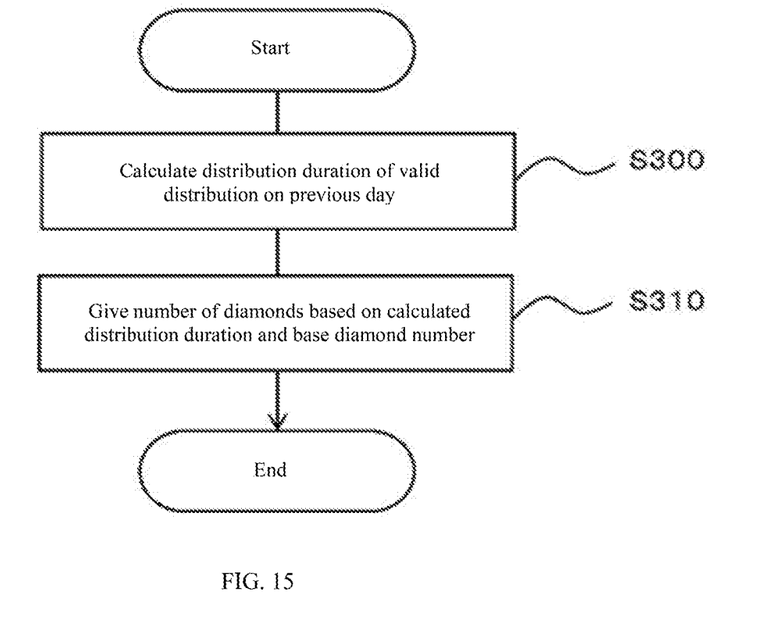
FIG. 15 A flowchart illustrating an example of the processing executed by the server 10 when a diamond is given.

Also, in this example, diamonds, which are the reward for the user as a distributor, are given on the basis of the distribution duration on the previous day and the ranking (the ranking on the previous day). FIG. 15 is a flowchart illustrating an example of the processing executed by the server 10 when diamonds are given. This processing is executed on a daily basis during the night. For example, it is executed earlier than the processing executed when updating the rankings of users as shown in FIG. 11 (e.g., daily at 12:00 a.m.).

The server 10 first calculates the distribution duration of the valid distribution for each user on the previous day, as illustrated (step S300). More specifically, the distribution duration of the valid distribution for a particular user on the previous day is specified by referring to the distributor user account, the distribution date and time, and the valid/invalid classification in the distribution information table 412. If a user is performing several valid distributions in a single day, the distribution durations of these distributions are added together.

Then, the server 10 gives each user a number of diamonds based on the calculated distribution duration and a base diamond number (step S310). More specifically, a number of diamonds obtained by multiplying the calculated distribution duration by a base diamond number is given to each user. The base diamond number is preset for each ranking so that the higher is the ranking, the greater is this number, and a base diamond number corresponding to the ranking of each user on the previous day is applied. When diamonds are given to a user, the number of held diamonds in the user information table 411 is updated. In this example, diamonds can be replaced by coins or real currency.

Here, an upper limit to the distribution duration for which diamonds will be given (such as up to 5 hours per day, etc.) may be provided. In this case, when the actual distribution duration exceeds the upper limit value, the upper limit value is applied as the distribution duration when specifying the number of diamonds to be given in step S310. Also, when the distribution duration goes over a specific threshold, a reduced base diamond number (such as 50%) may be applied to the portion exceeding this specific threshold.

In the example given above, the ranking was increased or decreased on the basis of a ranking meter value, but this updating of ranking on the basis of a ranking meter value is just an example, and the ranking may instead be updated on the basis of the value of some other parameter. For instance, the ranking may be increased or decreased directly on the basis of the rating of distribution points within a ranking band, rather than employing a ranking meter value. Also, the distribution points mentioned above are also just an example, and various kinds of parameters based on distribution performance of live video can be applied instead of distribution points.

In the example given above, the determination as to whether or not a distribution is valid was performed on the basis of the distribution duration, the number of viewers (maximum value), and the number of comments, but this determination can also be performed by some other method. For instance, in another example of this embodiment, the image of the live video being distributed is appropriately analyzed, and the distribution is determined not to be valid (to be invalid) if a moving person is not detected within a specific time length of time, for example.

The video distribution server 10 in the embodiment described above determines the ranking of a distributor on the basis of live video distribution performance (such as the number of viewers (maximum value), the number of likes, the number of comments, and the number of items), sets a base reward quantity (such as a base diamond number) for a distributor on the basis of the determined ranking, and gives rewards (such as diamonds) in a quantity based on the distribution duration of the live video and the base reward quantity, so even a distributor who is a novice can obtain rewards in a quantity based on the distribution duration and the base reward quantity by continuing to distribute live video. Thus, the video distribution server 10 promotes the distribution of live video by various distributors, including novices.

The processing and procedures described in this Specification may be realized by software, hardware, or any combination of these, in addition to what was explicitly described. For example, the processing and procedures described in this Specification may be realized by installing a logic circuit corresponding to said processing and procedures in an integrated circuit, a volatile memory, a nonvolatile memory, a magnetic disk, or another such medium. Also, the processing and procedures described in this specification can realized by loading computer programs (e.g., non-transitory computer-readable medium including instructions to be performed on a processor) corresponding to these processing and procedures, and can be executed by various kinds of computers.

Although the processing and procedures described in this Specification were described as being executed by a single device, piece of software, component, or module, such processing or procedures can be executed by multiple devices, multiple pieces of software, and/or multiple modules. Also, the software and hardware elements described in this Specification can be realized by integrating them into fewer constituent elements, or breaking them down into more constituent elements.

In this Specification, when a constituent element of the example implementations is described as being one or a plurality of things, or when it is described without any limitation as to number, that constituent element may be either one or a plurality of things, except when the context indicates otherwise.

DESCRIPTION OF THE REFERENCE NUMERALS

10 Video distribution server
11 Computer processor
15 Storage device
20 Communication network
30 User terminal
41 Information storage and management component
43 Basic function controller
45 Video distribution controller
47 Reward management component
60 Top screen
70 Distributor screen
80 Viewer screen
90 Item selection screen

The invention claimed is:

1. A live video distribution system comprising one or more computer processors, wherein, in response to execution of a readable command, the one or more computer processors execute:
   processing to distribute, to each of a plurality of viewers, live video provided by each of a plurality of distributors;
   processing to determine a ranking of each of the plurality of distributors from among a plurality of rankings based on at least the live video distribution performance of each of the plurality of distributors, wherein the plurality of rankings is arranged into a plurality of ranking groups, and wherein the processing to determine the ranking comprises determining the ranking of each of the plurality of distributors, based on at least a value of a specific parameter for each of the plurality of distributors, by one or both of,
   when a next highest ranking above a current ranking of the distributor is in a same ranking group as a current ranking group, increasing the ranking to the next highest ranking if the value of the specific parameter is above a first rank-increase threshold, and when the next highest ranking is in a different ranking group from that of the current ranking group, increasing the ranking to the next highest ranking if the value of the specific parameter is above a second rank-increase threshold that is greater than the first rank-increase threshold, or,
   when a next lowest ranking below the current ranking of the distributor is in the same ranking group as the current ranking group, decreasing the ranking to the next lowest ranking if the value of the specific parameter is below a first rank-decrease threshold, and when the next lowest ranking is in a different ranking group from that of the current ranking group, decreasing the ranking to the next lowest ranking if the value of the specific parameter is below second rank-decrease threshold that is less than the first rank-decrease threshold;
   processing to set a base reward quantity for each of the plurality of distributors based on at least the ranking of each of the plurality of distributors; and
   processing to give each of the plurality of distributors rewards in a quantity based on at least a distribution duration of the live video and the base reward quantity.

2. The system according to claim 1, wherein the live video distribution performance includes input results of input information inputted from viewers during distribution of live video.

3. The system according to claim 1, wherein the processing to determine the ranking includes giving a specific number of points to a distributor on the basis of at least the live video distribution performance, wherein the specific parameter for each of the plurality of distributors is based on the specific number of points.

4. The system according to claim 1, wherein the processing to give a reward includes:
   determining whether or not distribution is valid for each distribution of the live video; and
   excluding from the distribution duration of the live video the distribution duration in distribution where distribution was determined to be invalid.

5. The system according to claim 4, wherein the processing to give a reward includes determining whether or not distribution is valid for each distribution of the live video based on at least one of the following: the distribution duration, a number of viewers, a quantity of input information inputted from viewers, and results of image analysis of the live video.

6. A method for distributing live video, which is executed by one or more computers, said method comprising the steps of:
   distributing live video provided by each of a plurality of distributors to each of a plurality of viewers;
   determining a ranking of each of the plurality of distributors from among a plurality of rankings based on at least the live video distribution performance for each of the plurality of distributors, wherein the plurality of rankings is arranged into a plurality of ranking groups and wherein determining the ranking comprises determining the ranking of each of the plurality of distributors, based on at least a value of a specific parameter for each of the plurality of distributors, by one or both of,
when a next highest ranking above a current ranking of the distributor is in a same ranking group as a current ranking group, increasing the ranking to the next highest ranking if the value of the specific parameter is above a first rank-increase threshold, and when the next highest ranking is in a different ranking group from that of the current ranking group, increasing the ranking to the next highest ranking if the value of the specific parameter is above a second rank-increase threshold that is greater than the first rank-increase threshold, or,
when a next lowest ranking below the current ranking of the distributor is in the same ranking group as the current ranking group, decreasing the ranking to the next lowest ranking if the value of the specific parameter is below a first rank-decrease threshold, and when the next lowest ranking is in a different ranking group from that of the current ranking group, decreasing the ranking to the next lowest ranking if the value of the specific parameter is below a second rank-decrease threshold that is less than the first rank-decrease threshold;
setting a base reward quantity for each of the plurality of distributors based on at least the ranking of each of the plurality of distributors; and
giving each of the plurality of distributors rewards in a quantity based on at least a distribution duration of the live video and the base reward quantity.

7. A non-transitory computer-readable medium including instructions to be performed on a processor for distributing live video, wherein, in response to being executed by one or more computers, said instructions cause the one or more computers to execute:
processing to distribute, to each of a plurality of viewers, live video provided by each of a plurality of distributors;
processing to determine a ranking of each of the plurality of distributors from among a plurality of rankings based on least the live video distribution performance of each of the plurality of distributors, wherein the plurality of rankings is arranged into a plurality of ranking groups, and wherein the processing to determine the ranking comprises determining the ranking of each of the plurality of distributors, based on at least a value of a specific parameter for each of the plurality of distributors, by one or both of,
when a next highest ranking above a current ranking of the distributor is in a same ranking group as a current ranking group, increasing the ranking to the next highest ranking if the value of the specific parameter is above a first rank-increase threshold, and when the next highest ranking is in a different ranking group from that of the current ranking group, increasing the ranking to the next highest ranking if the value of the specific parameter is above a second rank-increase threshold that is greater than the first rank-increase threshold, or,
when a next lowest ranking below the current ranking of the distributor is in the same ranking group as the current ranking group, decreasing the ranking to the next lowest ranking if the value of the specific parameter is below a first rank-decrease threshold, and when the next lowest ranking is in a different ranking group from that of the current ranking group, decreasing the ranking to the next lowest ranking if the value of the specific parameter is below a second rank-decrease threshold that is less than the first rank-decrease threshold;
processing to set a base reward quantity for each of the plurality of distributors based on at least the ranking of each of the plurality of distributors; and
processing to give each of the plurality of distributors rewards in a quantity based on at least a distribution duration of the live video and the base reward quantity.

* * * * *